US012786513B2

(12) United States Patent
Potluru et al.

(10) Patent No.: US 12,786,513 B2
(45) **Date of Patent: *Nov. 3, 2026**

(54) PRIORITIZED CONTENT SELECTION AND DELIVERY

(71) Applicant: Comcast Cable Communications, LLC, Philadelphia, PA (US)

(72) Inventors: Vamsi Potluru, Washington, DC (US); Hans Sayyadi, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,419

(22) Filed: Aug. 1, 2023

(65) Prior Publication Data

US 2024/0073483 A1 Feb. 29, 2024

Related U.S. Application Data

(63) Continuation of application No. 16/997,486, filed on Aug. 19, 2020, now Pat. No. 11,758,224, which is a continuation of application No. 16/150,522, filed on Oct. 3, 2018, now Pat. No. 10,785,538.

(51) Int. Cl.

| | |
|---|---|
| ***H04N 21/466*** | (2011.01) |
| ***H04N 21/25*** | (2011.01) |
| ***H04N 21/442*** | (2011.01) |

(52) U.S. Cl.

CPC ..... *H04N 21/44224* (2020.08); *H04N 21/252* (2013.01); *H04N 21/4667* (2013.01); *H04N 21/4668* (2013.01)

(58) Field of Classification Search

CPC ............ H04N 21/4668; H04N 21/252; H04N 21/4667; H04N 21/44222; H04N 21/44224; H04N 21/4826

See application file for complete search history.

(56) References Cited

U.S. PATENT DOCUMENTS

| | | | |
|---|---|---|---|
| 6,853,982 | B2 | 2/2005 | Smith et al. |
| 7,801,888 | B2 | 9/2010 | Rao et al. |
| 8,176,043 | B2 | 5/2012 | Iwasa et al. |
| 8,613,024 | B2 | 12/2013 | Bovenschulte et al. |
| 8,645,398 | B2 | 2/2014 | Xia et al. |
| 8,745,666 | B1 | 6/2014 | Zaveri |
| 8,752,099 | B2 * | 6/2014 | Riedl ................ H04N 7/17318 725/86 |
| 9,081,857 | B1 | 7/2015 | Huet et al. |

(Continued)

*Primary Examiner* — Pinkal R Chokshi

(74) *Attorney, Agent, or Firm* — Banner & Witcoff, Ltd.

(57) ABSTRACT

Methods, systems, and apparatuses are described for a recommendation ranking system that uses viewing and/or browsing data of content items available from a communication system received from users of the system. The viewing and browsing data may be obtained from the users through different availability periods having varying price points for viewing the content items. Weighted values may be applied to the viewing and browsing data based on the price point or availability period of the content items associated with the collected data. A popularity index for the content items of the communication system may be determined based on the adjusted viewing and browsing data and a ranking of recommendations for content items may be generated based at least on the popularity index of the content items.

33 Claims, 7 Drawing Sheets

(56) References Cited

U.S. PATENT DOCUMENTS

| | | | |
|---|---|---|---|
| 9,165,069 | B2 | 10/2015 | Tseng |
| 9,202,221 | B2 | 12/2015 | Wise et al. |
| 9,392,314 | B1 | 7/2016 | Lewis et al. |
| 9,430,532 | B2 | 8/2016 | Basilico |
| 9,753,988 | B1 | 9/2017 | McGilliard |
| 10,007,732 | B2 * | 6/2018 | Bennett ............... G06F 16/9535 |
| 10,229,166 | B1 * | 3/2019 | Kim .................... G06F 16/9538 |
| 10,296,512 | B1 * | 5/2019 | Chandran ......... G06F 16/24578 |
| 10,313,755 | B2 * | 6/2019 | Kimble .............. H04N 7/17318 |
| 11,003,727 | B2 * | 5/2021 | Bartholomew ... G06F 16/24578 |
| 2001/0014868 | A1 | 8/2001 | Herz et al. |
| 2005/0177538 | A1 | 8/2005 | Shimizu et al. |
| 2007/0136753 | A1 * | 6/2007 | Bovenschulte .... H04N 7/17318 348/E7.071 |
| 2008/0127280 | A1 | 5/2008 | Kuang et al. |
| 2009/0132435 | A1 * | 5/2009 | Titus .................. G06Q 30/0283 705/400 |
| 2010/0138480 | A1 | 6/2010 | Benedetto |
| 2010/0205625 | A1 * | 8/2010 | Beyabani ......... H04N 21/25435 725/104 |
| 2010/0287033 | A1 * | 11/2010 | Mathur ............... G06F 16/9535 725/44 |
| 2012/0030050 | A1 | 2/2012 | Rey et al. |
| 2012/0079514 | A1 | 3/2012 | Riedl et al. |
| 2012/0151511 | A1 | 6/2012 | Bernard et al. |
| 2013/0263189 | A1 | 10/2013 | Garner |
| 2013/0311408 | A1 | 11/2013 | Bagga et al. |
| 2015/0281635 | A1 | 10/2015 | Tang et al. |
| 2016/0142774 | A1 * | 5/2016 | Sayyadi-Harikandehei ................ H04N 21/458 725/14 |
| 2016/0150280 | A1 | 5/2016 | Cui et al. |
| 2017/0228463 | A1 * | 8/2017 | Sharma ............... G06F 16/9535 |
| 2018/0124444 | A1 * | 5/2018 | van Zwol .......... H04N 21/8352 |
| 2018/0367863 | A1 | 12/2018 | Newman et al. |
| 2019/0287125 | A1 | 9/2019 | Kumar et al. |

* cited by examiner

RECOMMENDATIONS OF AVAILABLE CONTENT ITEMS 402 410 408 406 412 404

Before Price Sensitive Algorithm

| Rank | Item Title |
|---|---|
| 1 | Television Program A |
| 2 | Television Program B |
| 3 | Television Program C |
| 4 | Movie A |
| 5 | Television Program D |
| 6 | Movie B |
| 7 | Television Program E |
| 8 | Television Program F |
| 9 | Movie C |
| 10 | Television Program G |

After Price Sensitive Algorithm

| Rank | Item Title | Change in Ranking |
|---|---|---|
| 1 | **Movie D** | +35 |
| 2 | **Movie E** | +27 |
| 3 | Television Program A | -2 |
| 4 | Television Program B | -2 |
| 5 | Movie C | +4 |
| 6 | Movie B | -- |
| 7 | Television Program C | -4 |
| 8 | Television Program D | -3 |
| 9 | Television Program E | -2 |
| 10 | Television Program F | -2 |

FIG. 4

PRIORITIZED CONTENT SELECTION AND DELIVERY

CROSS-REFERENCE TO RELATED APPLICATIONS

This application is a continuation of and claims priority to U.S. patent application Ser. No. 16/997,486, filed Aug. 19, 2020, which is a continuation of U.S. patent application Ser. No. 16/150,522, filed Oct. 3, 2018 (now U.S. Pat. No. 10,785,538), each of which is hereby incorporated by reference in its entirety.

BACKGROUND

Users often desire to view content without first knowing a particular content item to view. For example, a user may desire to view a horror movie, but might not have a particular horror movie in mind. Some content providing systems provide recommendations of available content to users as suggestions for viewing. Such recommendations are often determined by operators of the content providing system as a "best guess" as to the content that the viewers may wish to watch or those content items that the operators desire to be selected for business reasons. Content providers may store the recommended content in one or more caches of the network based on the estimate that such content will be selected for viewing. When such recommendations are inaccurate, the network often must move content items to other storage locations within the network, creating bandwidth and performance strain on the network. More accurate recommendations may reduce such strain on the network.

SUMMARY

The following summary presents a simplified summary of certain features. The summary is not an extensive overview and is not intended to identify key or critical elements.

Methods, systems, and apparatuses are described for a recommendation ranking system that uses availability data of content items of a communication system by users of the system. The data may be obtained through different availability periods with varying accessibility levels for viewing the content items. A recommendation engine may apply weighted values to the viewing and browsing data based on the accessibility or availability period of the content items associated with the collected data. A popularity index for the content items of the communication system may be determined based on the adjusted viewing and browsing data and a ranking of recommendations for content items may be generated based at least on the popularity index of the content items. Further adjustments to the viewing and browsing data may be applied based on content item and/or user characteristics to generate one or more personal rankings of recommended content items.

These and other features are described in greater detail below.

BRIEF DESCRIPTION OF THE DRAWINGS

Some features are shown by way of example, and not by limitation, in the accompanying drawings. In the drawings, like numerals reference similar elements.

FIG. 4 is an example chart illustrating changes in a ranked list of recommendations of content items based on an adjusted popularity index of the content item from interactions with the content item through multiple pricing and availability windows.

DETAILED DESCRIPTION

Figure 1:
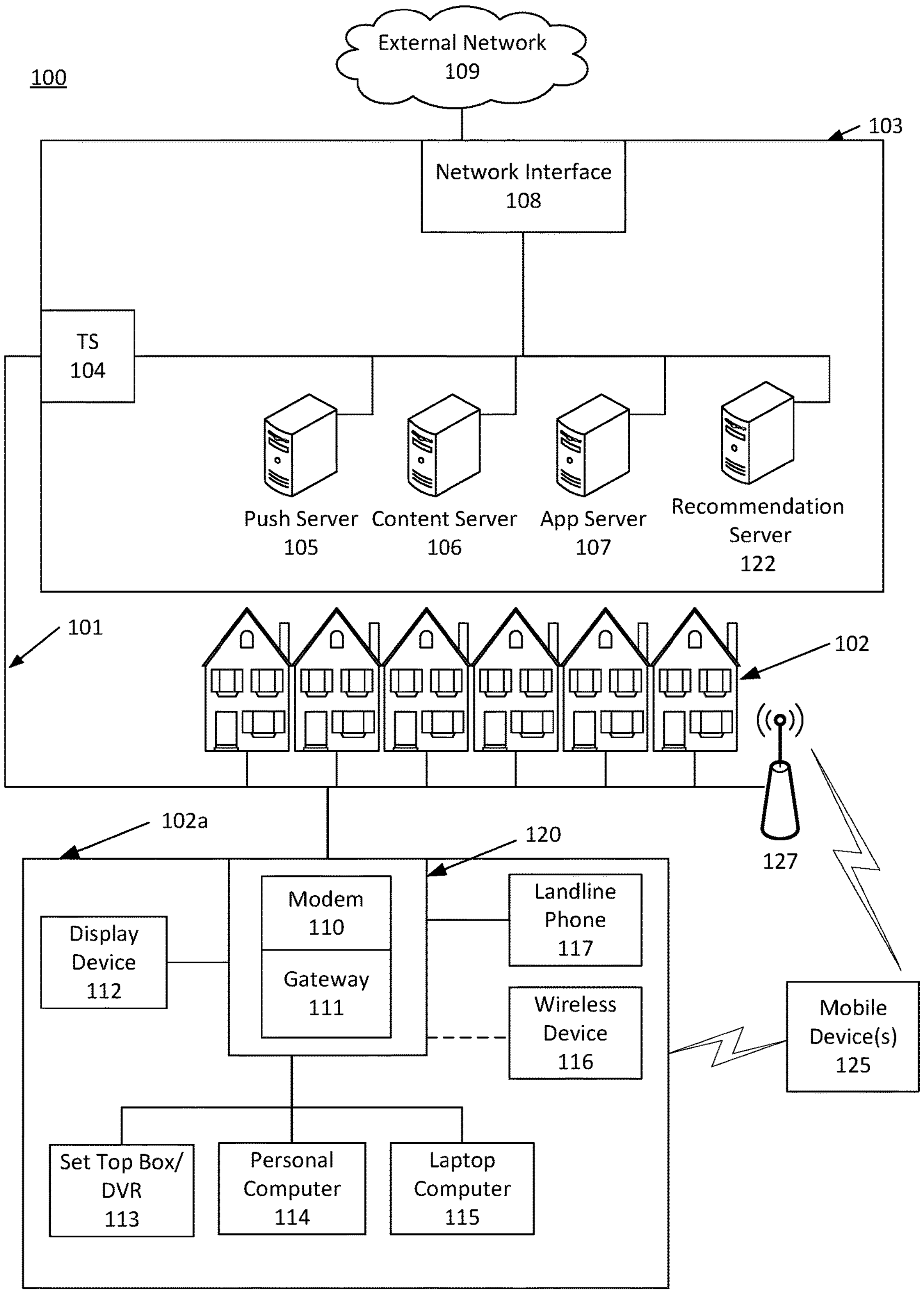
FIG. 1 shows an example communication network on which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including a recommendation server 122 (described below), additional push, content, and/or application servers, and/or other types of servers. Although shown separately, the push server 105, the content server 106, the application server 107, the recommendation server 122, and/or other server(s) may be combined. The servers 105, 106, 107, and 122, and/or other servers, may be computing devices and may include memory storing data and also storing computer executable instructions that, if executed by one or more processors, cause the server(s) to perform steps described herein.

An example premise 102*a* may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102*a* may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

The mobile devices 125 may communicate with a local office 103. The mobile devices 125 may be cell phones, smartphones, tablets (e.g., with cellular transceivers), laptops (e.g., communicatively coupled to cellular transceivers), wearable devices (e.g., smart watches, electronic eyeglasses, etc.), or any other mobile computing devices. The mobile devices 125 may store, output, and/or otherwise use assets. An asset may be a video, a game, one or more images, software, audio, text, webpage(s), and/or other content. The mobile devices 125 may include Wi-Fi transceivers, cellular transceivers, satellite transceivers, and/or global positioning system (GPS) components.

As described in more detail below with reference to FIGS. 3-6B, the content servers 106 and recommendation server 122 may provide one or more recommendations of available content items of the communication network 100 to one or more users of the system. Such recommendations may be based, at least in part, on viewing and browsing data (hereinafter referred to as "interactions") obtained from interfaces 102*a* at the premises 102. For example, the premise equipment 102*a* may receive, from a user of the communication system, an indication of an interest in a content item and/or view the content item on the display device 112. The interactions with the content item may be provided to the recommendation server 122 (or any other component) of the local office 103. The interaction data may be obtained from any number of premises 102 or users of the communication system. The recommendation server 122 (or any other component) of the communication network 100 may use the interactions to generate a list of ranked recommendations of content items. The recommendation server 122 may also adjust the interactions based on various price points and availability windows of the content items prior to generating the ranked recommendations list. The ranked recommendations list may be sent to premises 102 through links 101 by the local office 103. Generation of the ranked list of recommendations is provided in more detail below.

Figure 2:
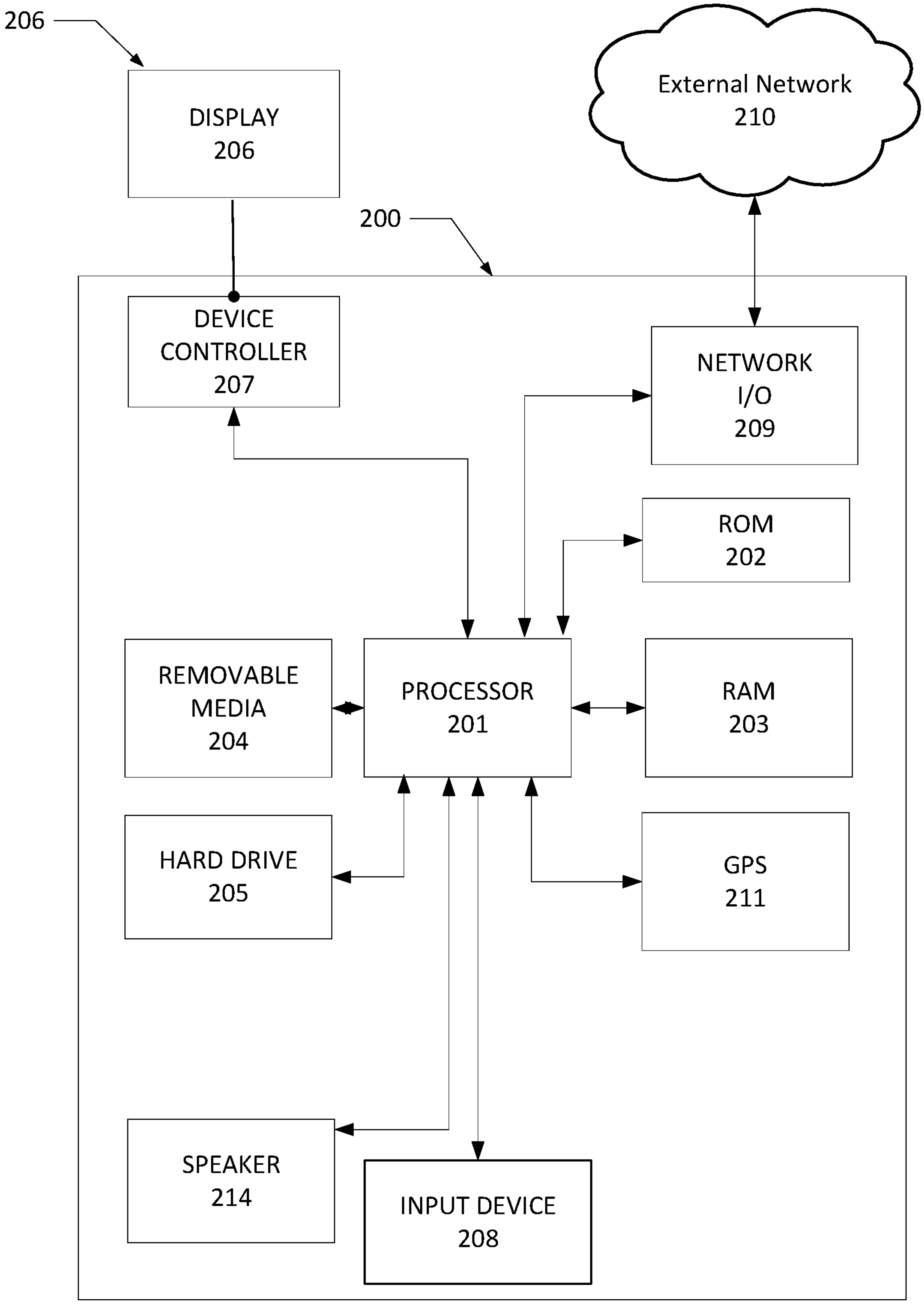
FIG. 2 shows an example computing device that may be used to implement any of the methods described herein.

FIG. 2 shows hardware elements of a computing device that may be used to implement any of the computing devices discussed herein (e.g., a computing device to process viewing and/or browsing data of content items of the network 100 and generate a ranked list of recommended content items based on the processed viewing and browsing data). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As mentioned above, the communication network 100 may provide one or more recommendations for content items available from the network to the premises 102 in communication with the local office 103. Such recommendations may be based on obtained viewing and browsing information or data concerning the content items, otherwise referred to as interactions. One data point that the recommendation server 122 may consider is a measured popularity of a content item. The recommendation server 122 may provide a ranked listing of the most popular content items of the communication network 100 to users under the assumption that those content items that are the most popular may be of the most interest to all users of the system. However, one metric for determining the popularity of a content item is total number of daily views of the content item by each user of the communication network 100. The larger the number of users that view a particular content item, the more popular the recommendation server 122 may determine the content item to be. The communication network 100 may count the number of daily views of all available content item and use the daily viewing totals to generate a ranked list of content item recommendations, where the ranking of each content item within the ranked list is based on the total number of daily views within the system.

Although total daily views may provide some indication of a popularity index of a content item, other data points may also be considered and may be more useful for providing content item recommendations to user of the network 100. For example, some content items available through the communication network 100 may have various price points or availability windows at which viewing the content item costs a particular price or price range at different times from after the content item first becomes available. The different costs associated with each pricing point or availability window may affect the number of daily views of a content item such that reliance on total number of daily views alone might provide an accurate estimation of a popularity index of a content item. A price or price point for a content item may be a particular price to view the item, such as a price to purchase or rent the content item. A price or price point may also be a range of prices to view or otherwise access the item, such as between $8.00 to $10.00 to access the content. A price or price point may include a set of prices associated with different time periods or availability windows, such as a price or price range to purchase or own the content, a price or price range to rent the content, etc. A price or price point may also include a set of prices associated with different version types, such as a price to access an extended version of the content or a price to access content with additional features.

Figure 3:
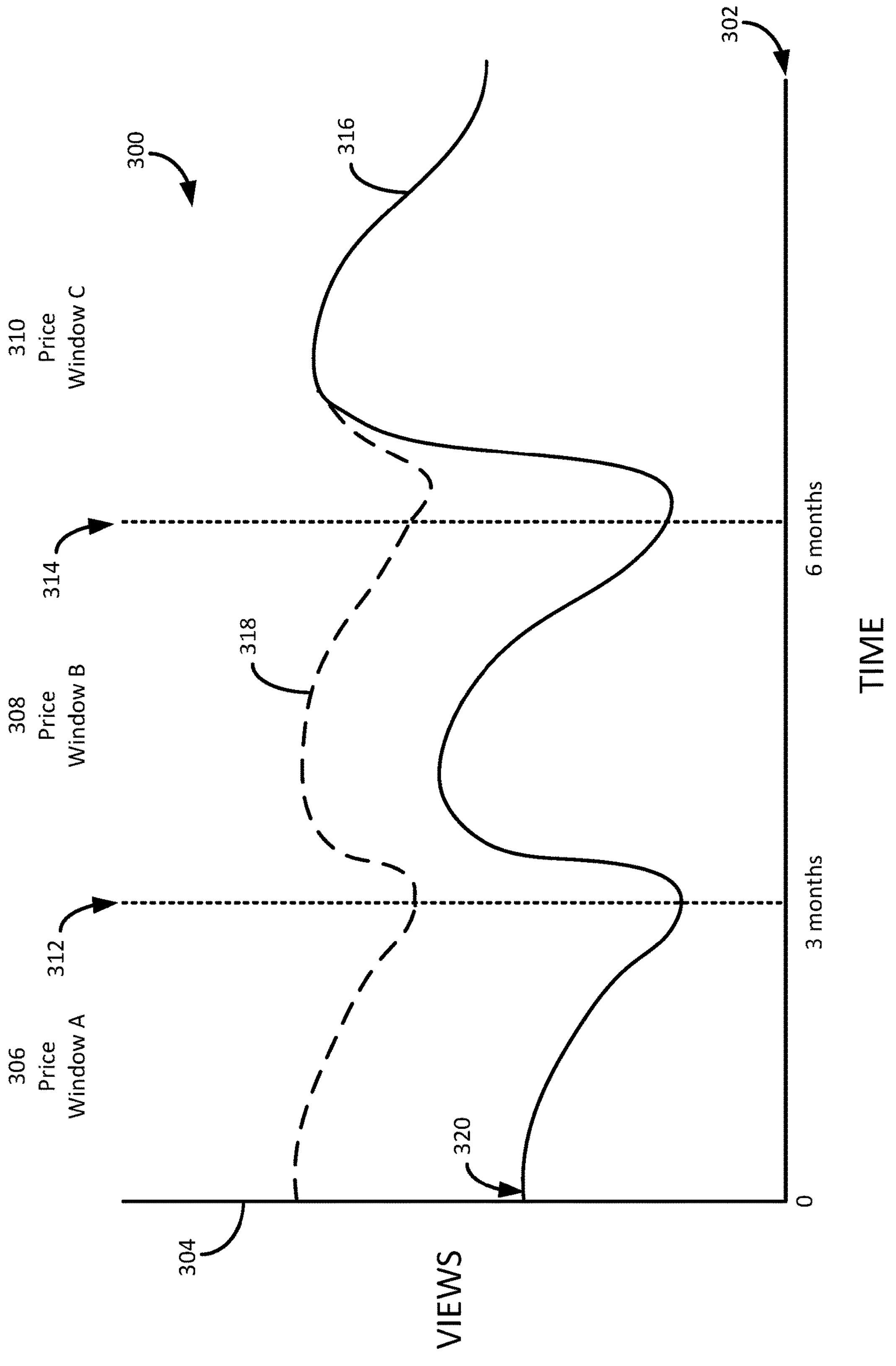
FIG. 3 is a graph of example views of a content item over time through multiple pricing and availability windows.

FIG. 3 is a graph 300 of example of measured interactions of a content item available from a communication network 100 over time through multiple pricing points and availability windows. Interactions may comprise views and browsing activities for content items of the communication network 100. For example, daily or weekly views of a content item may be included in the measured interactions. Browsing activities may also be included in the measured interactions, such as instances where a user of the network 100 selects to view information of the content item, including the price point, but opts to not view the item, potentially due to the price point to view the item. Subsequent viewing of the content item by the user at a lower price may also be included in the browsing and viewing activities of the interactions with the content item.

The graph 300 shows a number of interactions (y-axis 304) by users of a communication network 100 of a content item over a period of time (x-axis 302). The daily total number of views of the content item may be incremented by the network 100 if the content item is selected by a user and at least 80% of the content is viewed. However, determining the number of views of a content item may occur in any manner. The network 100 may obtain hourly or weekly views of the content item for analysis. The network 100 may also track views of the content item by particular users of the network or users within a particular geographic area.

Many content items available from the network 100, such as movies or pay-per-view live events, may transition through different price points based on the length of time the content item has been available from the network. For example, a movie item may be initially available to users of the network 100 to buy at a full price for the movie (shown in graph 300 as a pricing window A 306). The purchase price of a movie item may reflect those content items that are new to the network and be similar to a ticket price of viewing the movie at a movie theater. At some later time 312 (such as one-month or several weeks after the content item is first available 320 from the network 100), the content item may become available at a less-expensive price point (shown in graph 300 as a pricing window B 308). In this pricing window, alternate options for viewing the content item may be made available for a smaller fee. For example, although the movie is still available to purchase at the full price in the pricing window B 308, another option to temporarily rent the movie may be made available for a smaller fee than the purchase price. Those users that are unwilling to pay the full purchase price for the content item may pay the smaller fee to rent the content item instead.

During the pricing window A 306, the graphed number of interactions 316 of the content item is limited to users who purchased the movie as this is the only option available to view the content item during that time. During the pricing window B 308, the graphed number of interactions 316 of the content item may include both purchased views and rented views as now two options to view the content item are available. The total number of interactions of the content item for each of the pricing windows 306-310 includes all views and browsing activities, regardless of which pricing option the user selects. As shown, the increase in the rental views of the content item at the beginning of the price window B 308 results in an increase in the total number of views of the content item.

In a third pricing window 310, the content item may be viewed at a free/premium option. The free/premium pricing option allows the user to view the item for free if the user has particular channels included in the user's package of channels provided by the network 100. For example, the user of the network 100 may pay a monthly charge for access to a premium channel, such as HBO®. If the content item being graphed is available to the user on an HBO channel, then the user may select the content item and view the item without any additional cost. Other content items may correspond to other premium or free channels. The pricing window C 310 includes a time period over which the content item is free to view without having to purchase or rent the item. Other pricing windows, structures, and/or levels of access to a content item may also be included in the graph 300 and the communication network 100, although not discussed in detail herein. For example, a content item may go through several purchase and rental prices the longer the content item is available. The price of the content item may increase over time as interest in the item similarly increases. Alternatively, a content item might not be available to be viewed for free regardless of the number and types of channels available to a user of the network 100.

The graph 300 shows a possible number of interactions of a content item available from a communication network 100 as the content item is available within three pricing windows. As shown, an initial interest in the content item as the item is first available 320 results in users of the network 100 purchasing the content item to view. Over time, but still within the first pricing window 306, the number of interactions of the content item may begin to decrease. In a second pricing window 308 (in which the content item is available to rent as well as buy), the number of interactions of the content item may increase as those users who were unwilling to purchase the item at full price select to view the item at the lower rental price. The number of interactions of the item may spike at the beginning of the second pricing window 308, but may also begin to decrease as fewer users select to view the content item at the new price. The number of interactions of the item may spike at the beginning of the third pricing window 310 as users select to view the item for an even smaller fee are added to those users selecting to buy or rent the content item. Over time, the number of interactions decreases as fewer users select to view the item. The number of interactions within the third pricing window 310 (or any other pricing window 306-308) might not decrease as the network 100 may add more subscribers or users that view the content item. As shown in the graph 300, therefore, daily viewing totals of a content item may take on a sinusoidal shape with spikes in viewership as the content item enters a lower pricing window followed by a decrease in viewership within the pricing windows 306-310.

The communications network 100 may use a graph similar to the graph 300 of FIG. 3 to determine a total number of selected interactions of the content item and provide recommendations to users of the network based on the graph. However, total number of interactions of a content item might not accurately reflect a popularity of a content item within the network or system, particularly as that content item is available at varying prices. Using graph 300, although the total number of interactions of a content item in pricing window A 306 may be lower than the total number of views in other pricing windows, those users viewing the content item in the pricing window A are willing to pay the higher purchase price. Further, total daily viewing numbers might not reflect a user's likelihood to select to view the item if recommended, thereby limiting the effectiveness of the ranked recommendations. For example, a particular user may be likely to purchase a content item if included in a list of recommended content items, but might not receive the recommendation for the content item because the recommendation list may be based on total views.

Estimating the content items that may be viewed by users of the network 100 may aid in network in determining within the network certain content items are stored. The network 100 may attempt to store popular content items near the users likely to view the content item in a hierarchy of cache servers. Volatility to the selection of content items to view may cause the network 100 to move content items up and down the cache hierarchy, creating bandwidth and performance strain on the network. A more accurate recommendation system that considers the various price and availability windows for the content item may reduce this strain on the network 100 by anticipating which content items are more likely to be viewed and storing those content items within the cache hierarchy accordingly.

A popularity algorithm may be trained and a popularity index to a recommendation algorithm may be adjusted based on pricing variations of content items. Viewership and browsing totals (also referred to as "interactions") for content items may be automatically normalized such that items within the pricing window A 306 and the pricing window B 308 (or any other pricing window in which obtaining the content item includes paying a fee) may be as likely to appear in a list of recommended content items as those items that are free to view. Storage of the content items within a cache hierarchy of the network 100 may also be determined. Coefficients or weights to the number of interactions of a content item based on the type of impression or price to view the item may be determined and applied. Application of the weighting values may normalize the content interactions for the content item and provide an adjusted graph of content item interactions that accounts for interactions within the various pricing windows. For example, the total interactions graph 316 peaks in price window C 310 if the content item is free to view through the network 100 as more users view the content item if the item is free to view than if viewing the content item requires paying a fee (in the price window A 306 or the price window B 308). Potentially interested users in a content item willing to purchase the content item may thus be provided with the recommendation. In particular, FIG. 4 shows example charts illustrating changes in a ranked list of recommendations of content items based on an adjusted popularity index of the content item from interactions with the content item through multiple pricing and availability windows. The recommendation charts may be provided to users of a network 100 as a ranked recommendation list of content items for viewing by the users, as discussed in more detail below.

Recommendation chart 402 shows a ranked list of recommended content items for a content delivery network 100 that includes a popularity index that is not adjusted for availability and price of the content items. As discussed, the ranking of the recommended content items may include a popularity component or index. The popularity index may be based, for example, on total interactions of the corresponding content item in the list 402. For example, Television Program A 410 is ranked as the highest recommended content item in list 402. This ranking may be based on a measured number of interactions of the Television Program A 410 over the previous seven days within the network 100. Other inputs to a ranking algorithm may be included to generate the ranked list of recommendations, including but not limited to, user preferences and business considerations. Regardless of the ranking and recommendation algorithms used, the network 100 may use the ranked list of recommended content items to provide recommendations to users of the network.

As shown in chart 402, the ranked recommendations may comprise any content item of the network 100, including television programs and movies. However, because television programs are typically free to view through the network 100, the total number of views of television programs may be high if compared to views of movies that may require a fee to view. As the ranking of the recommended content items is based on the total number of interactions of the content item, those content items in price window C 310 of FIG. 3 are more likely to be ranked high over content items in the price window A 306 or the price window B 308.

Recommendation chart 404 shows a ranked list of recommended content items for a content delivery network 100 that comprises a popularity index that is adjusted for availability and price of the content items. The popularity index for the ranking algorithm for chart 404 may apply a weighted value to those content items that are interacted with at a purchase (the price window A 306) or a rental (the price window B 308) to increase the ranking of those content items. In this manner, the ranking of the recommended content items may become sensitive to a price to view the item. Using chart 404, Movie D and Movie E 406 may be movies that are only available from the network 100 for a fee, such as in the price window A 306 or the price window B 308. Movie D and Movie E do not appear in the ranked list of recommendations 402 that does not adjust interactions based on a price to view as the total number of interactions of the movies may be low due to the price to view. However, once the popularity index of Movie D and Movie E 406 are adjusted through the application of one or more weighted values, the movies may appear on the ranked recommendations list. A change in the ranking 414 from list 402 to list 404 is provided in FIG. 4 to show this point. As shown, Movie D has increased 35 places in the ranked recommendations list and Movie E has increased 27 places. Other content items, such as Movie C 404, may still have enough total interactions to be ranked in the top ten recommended content items in list 402 even though the content item is only available for a fee. Through the application of the weighted values, the ranking of Movie C is also increased (by four places in this example). As most television programs are available for free or for a minimal fee, the ranking of the television programs may decrease in the ranked list as the interactions of fee-based content items are adjusted upward.

Interactions of the content item in the price window A 306 and the price window B 308 may be adjusted upwards to be similar to the interactions measured in the price window C 310 based on the application of weighted values. A content item may thus be more likely to appear in a recommendations listing (due to the higher popularity index) in the pricing window A 306 than in previous recommendation algorithms that rely only on total interactions of the item, as shown in ranked list 402 and ranked list 404. In addition, the adjusted recommendations may reduce the depth of the trough in the graphed interactions between the price windows 306-310 of the content item as shown in FIG. 3. This provides stability in the popularity index for the content item used for the recommendations of content items to users of the network 100 and stability in the storage of such content items within the network. By providing price sensitive rankings of recommended content items to users, those items that comprise a fee to view may be more likely to be selected to view by the users as those content items that are most relevant to users may be provided in the ranked list of recommended content items. Storage location of such content items may be adjusted within the cache hierarchy of the network 100 accordingly.

The coefficients for adjusting a popularity algorithm may be learned from historical performance of other content items of the network 100 or a particular content item. For example, the network 100 may use past performances of content items currently available in the price window C 310 to gain insight into the interactions of the content items if in price window A 306 and price window B 308. Through an analysis of several content items, the weighted values included in the popularity algorithm may be determined. Such weighted values may be adjusted based on a machine learning analysis of historical impression information to tune the popularity algorithm.

A popularity algorithm for recommendations in a communications network 100 of content items may also be adjusted based on additional metrics of the system. For example, activities of users to purchase/rent or not purchase/rent after browsing a content item may be used in generating the weighting coefficients that are applied to the popularity algorithm. Also, recommendations of content items provided to users of the network 100 may be adjusted based on information obtained about particular users. For example, the recommendation engine may use past interactions of content items, either through views of content items or browsing of content items, to determine a user preference. A ranking of recommendations provided to the user may then be based on the user preferences. Recommendations provided to users of the network 100 may be based on one or more business considerations, discussed in more detail below.

Figure 5:
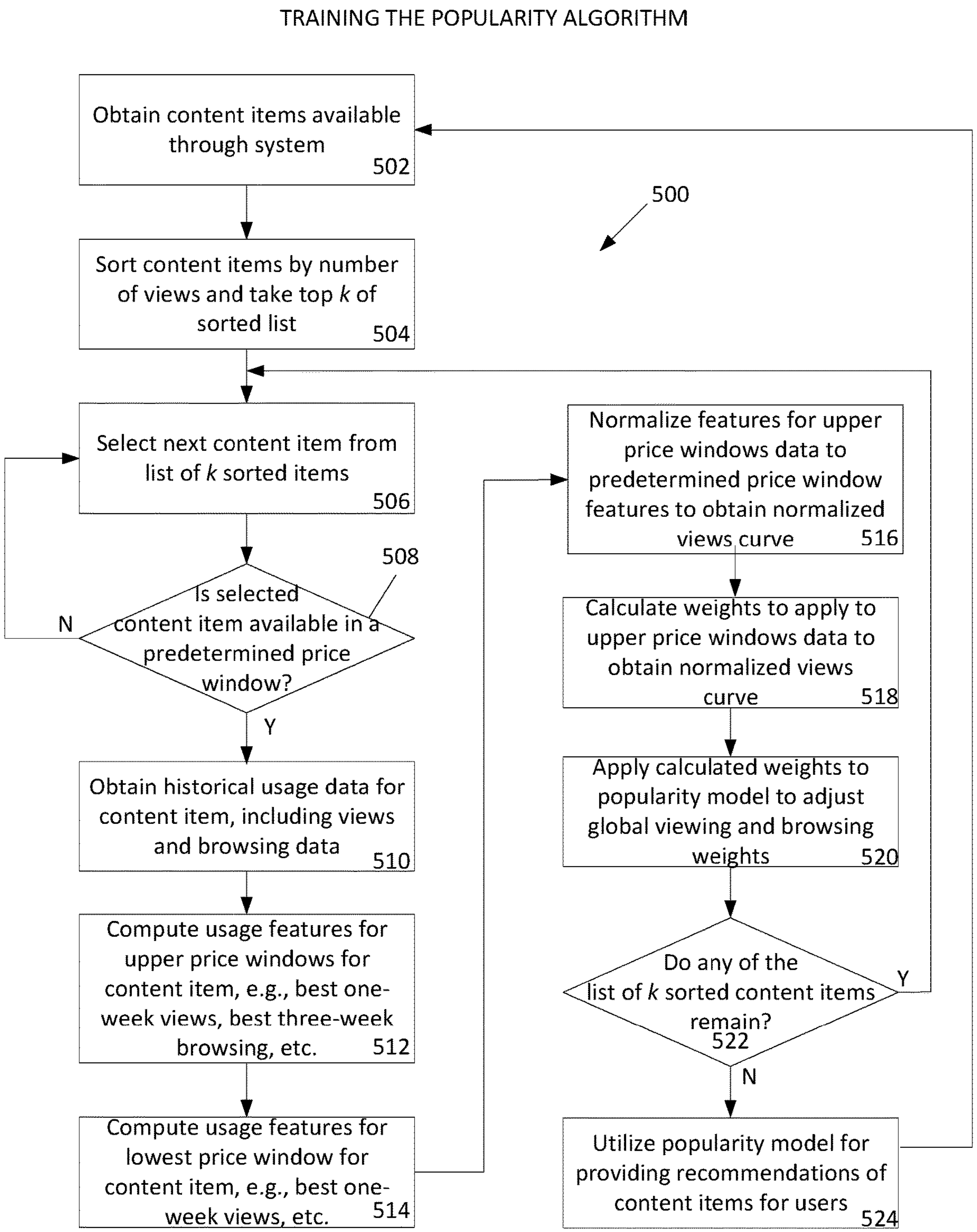
FIG. 5 is a flow chart showing an example method for training a popularity index algorithm to generate one or more weighted coefficients for use in providing content recommendations to users of a communication system.

FIG. 5 is a flow chart showing an example method 500 for training a popularity index algorithm to generate one or more weighted coefficients for use in providing content recommendations to users of a communication system. The method 500, or one or more operations of the method, may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 502, content items available from a network 100 or communication system may be obtained. As mentioned above, content items of the system may be any multimedia content available from the network 100. In step 504, the content items may be sorted by the number of total interactions over a previous period of time and the top k of the sorted list are analyzed to limit processing of all of the content items of the network 100. The value of k may thus be based on the total number of content items available from the network 100 and may, in some examples, include all of the content items of the network. The number of total views of each of the content items may be obtained for the previous seven days from the time of analysis. Any time period may be used if obtaining the total number of views, such as the previous 24 hours, the previous 30 days, the previous year, etc. The top k content items from the sorted list may be any number of content items. For example, k may be 500 content items or 100 content items. The number of content items selected may also be based on a percentage of total content items available from the network 100, such as 10% of the total number of available items, 25% of the total number of available items, etc. The number of content items may also be based on a feedback component that uses a measured accuracy of a recommended content item. For example, if a recommended content item is selected for viewing less than 10% of the time it is presented to a user of the network 100, the value k may be increased to comprise more content items in generating the weighted coefficients of the popularity algorithm.

The k number of content items might not be obtained from a listing of all content items of the network, but may instead be selected from a listing of all or some of a particular type of content item. For example, a listing of all or some action movies available through the network 100 may be obtained in step 502 for instances of generating an action movie specific recommendation list. Although the list of content items may still be sorted based on total number of interactions, the content items from which k number of content items is selected from may be limited to particular types of content items. The obtained content items may be audio files (such as songs or audio books). The obtained content items may also be children's programming such that the k number of content items comprises children's programming. As the method 500 of FIG. 5 may determine one or more weighted coefficients for the different prices or availability of the content items of the network, such weighted coefficients may be particular to a subset of all available content items, such as action movies, audio files, or television programs. Several weighted, price-sensitive coefficients may be generated for content items of the network 100, including coefficients based on total interactions of the content item and/or coefficients for various subsets of the content items of the network.

In step 506, the next content item in the sorted list of k content items may be selected for analysis. The recommendation server may determine if the selected content item is available in a predetermined price window in step 508, such as an price window in which the content items are available for free as that price window is most likely to include the largest number of interactions with the content item. In general, content items that are determined to be in an availability or price window that provides sufficient historical interactions of the content item for calculation of weighted coefficients comprise the list of k content items. Although discussed herein as determining if the content item is from a free or lowest price window, the training algorithm of FIG. 5 may use content items at any price available from the network 100. For example, the selected content item may be selected from those content items available to rent, from those content items available for free, from those content items available for a lower rental fee of more than one rental fee, etc. If the selected content item is not available from the lowest price window, the next content item from the list of k sorted content items is selected at step 506.

If the selected content item is available from the selected price window, historical viewing or browsing data for the content item is obtained in step 510. The historical viewing and browsing data, or interactions, for the content item may be for any previous time period from which the content item is available from the network 100. Using the viewing graph 300 of FIG. 3, the selected content item may be available from the network 100 in price window C 310. The obtained historical interactions of the content item may comprise the viewing and browsing data of the content item within the price window B 308 and/or the price window A 306, spanning the previous six months or more. In general, the obtained historical interactions may span any previous price windows or prices at which the content item was available. Such obtained data may comprise total number of views of the content item over the previous time period, browsing interactions with the content item (such as selection to view more information of the content item without a view or payment of the viewing fee), partial views of the content item, and the like.

In step 512, usage or interaction features of the selected content item are computed for the price windows of the content item above the selected price window. For example, usage features (such as best one-week total views, best three-week browsing, maximum total views on peak viewing day, minimum total views on lowest viewing day, maximum browsing number on peak browsing day, etc.) may be computed from the historical interactions from the highest price window 306. Similar usage features may be computed for the selected content item from the historical interactions from the next highest price window 308. Usage features, whether similar to those described above or not, may be computed for any price window of the selected content item from the historical viewing and browsing data. In particular in step 514, the usage data features for the interactions of the selected content item may be computed for the lowest price window. The computed usage data provides comparisons of the interactions between the various price windows from which the selected content item is available from the network 100 over the lifetime of the content item.

In step 516, the usage data for the selected content item at the upper price windows may be normalized to the same or similar usage data for the content item at the lowest price window. For example, assume that total maximum one day views for a content item if free to view (e.g., in the price window C 310) is 1000 views. From the historical viewing data, the total maximum one day views for the content item if available for purchase (e.g., in the price window A 306) may be computed at 100 views. Similarly, the total maximum one day views for the content item if available for rent (e.g., in the price window B 308) may be computed at 400 views. A similar computation for other usage features may be computed, such as best one-week total views for each of the price windows or price points. Usage data of browsing of the content item (where a user of the network 100 selects the content item but opts to not view the item, potentially due to the price to view the item) may also be computed and compared between the various price windows from which the content item is available over the lifetime of the content item.

In step 518, weighted coefficients or values may be calculated to apply to views in particular price windows to normalize the interactions of the selected content item in those price windows to the interactions of the selected content item in the lowest price window. Continuing the above example, it may be determined that the same content item has a maximum daily viewing total of 1000 in the price window C 310 and a maximum daily viewing total of 100 in the price window A 306. Thus, to normalize the viewing data within the price window A 306, the viewing total data from the price window A may be multiplied by 10, such that the calculated weighted coefficient for the viewing data from the price window A may be set at 10. Similarly, it may be determined that the same content item has a maximum daily viewing total of 400 in the price window B 308. To normalize the viewing data within price window B 308 to the viewing data within the price window C 310, the viewing total data from the price window B may be multiplied by 2.5, such that the calculated weighted coefficient for the viewing data from the price window B may be set at 2.5. Calculating the weighted coefficients for the interactions may comprise any type of computed usage data of the historical data of the selected content item, not just the maximum daily viewing totals. Also, the computed weight coefficients may normalize the historical data to any target value and not necessarily the viewing data at the lowest price window. Alterations in the normalization target for the historical interactions may be determined by the network 100 or an administrator of the network to fine-tune the popularity algorithm for a desired result. Normalizing of the interactions to the price window C 310 is shown by dotted line 318 of FIG. 3. The graphed interactions for the price window A 306 and the price window B 308 are increased to be similar to the interactions of the price window C 310.

Calculating the weighted coefficients for the interactions may comprise other usage features. For example, a predicted popularity of a content item may include the following equation:

$$\text{Predicted popularity} = a*\text{max\_one\_week\_buy total} + b*\text{max\_three\_week\_buy total} + c*\text{max\_one\_week\_rent total} + d*\text{max\_three\_week\_rent total};$$

where a, b, c, and d are the weighted coefficients learned from the historical data for the content item compared to the measured popularity of the content item price window C 310. Other interactions or usage features may be considered and included in various equations to predict the popularity of a content item. Other learning functions may also be incorporated into the predicted popularity equation, such as use of linear models, random forests, support vector machines, logistic regression, and the like to obtain an estimated usage or interactions with a content item in the various pricing windows 306-310.

The calculated weight coefficients associated with the selected content item may be applied to a global popularity model or algorithm to adjust the global popularity algorithm. The global popularity algorithm may be based on the calculated weight coefficients for a plurality of content items. For example, a popularity algorithm may be generated by the network 100 to apply to determine a popularity index for all content items of the network, as discussed above. This popularity algorithm may comprise one or more weighted coefficients to account for different price windows of the content items within the network. Weighted coefficients may already exist within the system for viewing data for content items in the price window A 306 and the price window B 308. In step 520, the calculated weight coefficients for the selected content item may be applied to the global weight coefficients of the global popularity algorithm to adjust or alter the global weight coefficients. For example, the global weight coefficients of the popularity algorithm may be an average of all or some previously calculated weight coefficients of content items from the network 100. Adjustment of the global weight coefficients may comprise recalculating the average of the previously calculated weight coefficients with the weight coefficients from the selected content item included. If the selected content item is the first content item for which weight coefficients are determined, the global weight coefficients may be set as the weight coefficients for the selected content item. Weight coefficient calculations of other content items may then be used to adjust the global weight coefficients of the popularity algorithm.

In step 522, the recommendation server 122 may determine if any of the k sorted items remain. If yes, the next content item from the list of k sorted items is selected at step 506 and weight coefficients for the next selected content item is calculated at steps 508-520. If none of the k sorted items remain, the training of the popularity model or algorithm is complete and the model may be used by the network 100 to generate ranked recommendations to users of the network in step 524. The method 500 described in relation to FIG. 5 may be executed any number of times to train the popularity algorithm by returning to step 502. For example, the method 500 may be executed daily by the network 100 to adjust the popularity algorithm for the content items available from the network 100. The training algorithm 500 may also be executed monthly or as new content items become available from the network 100. Regardless of how often the method 500 is executed, one or more weight coefficients for one or more price points for the content items of the network 100 may be generated and included in a popularity algorithm.

With the weight coefficients determined for the popularity algorithm, the network 100 may determine a popularity index score or value for each content item of the network for use in generated a ranked recommendation list of content items. For example, FIGS. 6A-6B comprise a flow chart showing an example method for obtaining interactions with a content item through multiple pricing windows and generating a ranked list of content recommendations to users of a communication system based at least on one or more weight coefficients associated with the multiple prices and availability of content items. The method 600, or one or more operations of the method, may be performed by one or more computing devices or entities. For example, portions of the method 600 may be performed by components of the network 100 or the computing device 200. The method 600 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 602, an available content item from the network 100 may be selected for analysis and scoring for use in providing a ranked list of content item recommendations to users of the network. Any content item may be selected. In step 604, historical viewing data for the selected content item may be obtained. The historical viewing data for the selected content item may include views of the item through the network 100 over the previous week. However, the period of time of the historical viewing data for the content item may be for any length of time. Further, the historical viewing data may comprise any of the views of the content item through the network 100, including but not limited to, a percentage of the total length of the content that was viewed, prices for viewing the content item selected by the users of the network, day/time of the most simultaneous viewing of the item on the network, day/time of the smallest simultaneous viewing of the item on the network, etc. Total views of the content item over the previous seven days may be obtained, including total views within a first price window 306 (such as those selections to purchase the content item), total views within a second price window 308 (such as those selections to rent and view the content item, and total views within a third price window 310 (such as those selections to view the content item for free). The content item might not be available for viewing in one or more of the price windows over the previous week. For example, the content item might only be available for purchase for the first few days of the previous week time period and transfer into a second price window (to possibly rent the content item) for the latter part of the previous week time period. Even though the content item may become available for rent, users of the network may still opt to purchase the content item at the higher price, even within the second price window 308. Also, it should be appreciated that actual viewing of the content item may or may not be counted as a view within the historical viewing data for purchases or rental of the content item. The act of purchasing or renting the content item to view at a later time may also be counted as a view of the content item for the purposes herein.

In step 606, historical browsing data for the content item may also be obtained. Browsing data may comprise examples where a user of the network provides some interest in the content item but does not purchase, rent, or view the content item. For example, a user of the network 100 may select to be presented with a synopsis of a content item, view artists associated with the content item, determine a price for viewing the content item, etc. These actions may be determined as an interest in the content item by the user of the network 100 and included in the historical browsing data of the content item. Other browsing activities may comprise a measured length of time between if an indication of the content item is displayed to a user. For example, a link to obtain additional information for a content item may be displayed on a display device to a user of the network 100. The user may consider selecting the link for some time, which may be measured. The length of time the content item indication is displayed before the user selects to view a different indicator of another content item may be measured and included in browsing activity of the content item. The time period over which the historical browsing data is obtained may be any length of time, such as the previous week, the previous ten days, the previous month, etc.

The weighted values from the trained popularity algorithm or model may also be obtained for the various price windows of the content items of the network 100 in step 608. As discussed above, the weighted values or coefficients for the price windows or availability of the content items of the network 100 may be determined through method 500 and provided to a popularity algorithm or model to adjust viewing and browsing data responsive to a price for viewing content items. The weighted coefficients may be applied for all or a majority of the content items or may be limited to particular types of content items of the network 100. For example, the weighted coefficients may be particular to content items identified as action movies. For coefficients of particular types of content items, the selected content item from step 602 above may match one or more descriptors associated with the particular weight coefficients. The viewing weighted coefficients may also be different than the coefficients for browsing interactions. For example, a weighted coefficient for a purchased view of the content item may be 10, while a browsing interaction (such as viewing information of a content item including price but abstaining from viewing the content item at the provided price) may have a weighted coefficient of 2.

In step 610, the recommendation server 122 may determine if the historical data (viewing and/or browsing data) of the content item includes historical data for a first price to view the item. It may be determined if the historical interactions for the content item includes any purchases or browsing to purchase the content item from the network 100. If yes, the corresponding calculated weight coefficient from the popularity algorithm is applied to the historical interactions for the first price in step 612. For example, the historical viewing data for the content item may indicate that 100 purchases of the content item occurred over the interactions data period of time. This viewing data may be multiplied by the weight coefficient for purchases (calculated in the above example as 10) such that the total calculated number of views for the content item at the purchase price is 100 views*10 coefficient=1000 views. Similar calculations may be applied to the historical browsing data, such as multiplying each browse of the content item by 10 to obtained an adjusted browsing popularity index for the content item. The weight coefficient for a historical view at the first price and the weight coefficient for a browsing data may be the same or different values. For example, a measured browsing interaction with a content item at a purchase price may be multiplied by 2 to reflect the interest in the content item, even though the content item was not viewed, where a measured purchase of the content item may be multiplied by 10.

If the historical interactions for the selected content item does not include data for the first price or after the weighted coefficient for the data of the first price is applied, it may be determined if the historical interactions (viewing and/or browsing data) of the content item includes historical interactions for a second price to view the item in step 614. It may be determined if the historical interactions for the content item includes any rentals or browsing to rent the content item from the network 100. If yes, the corresponding calculated weight coefficient from the popularity algorithm is applied to the historical interactions for the second price in step 616. For example, the historical viewing interactions for the content item may indicate that 300 rentals of the content item occurred over the historical data period of time. Typically, the cost for renting a content item is lower than the cost for purchasing the item such that a rental view may be considered as a view at a second price. The rental viewing interactions may be multiplied by the weight coefficient for rentals (calculated in the above example as 2.5) such that the total calculated number of views for the content item at the purchase price is 300 views*2.5 coefficient=750 views. Similar calculations may be applied to the historical browsing data, such as multiplying each browse of the content item by 1.5 to obtain an adjusted browsing popularity index for the content item at the second price. Similar to the first price, the weight coefficient for a historical view at the second price and the weight coefficient for a browsing data may be the same or different values.

If the historical interactions for the selected content item does not include data for the second price or after the weighted coefficient for the data of the second price is applied, it may be determined if the historical interactions (viewing and/or browsing data) of the content item includes historical interactions for a third price to view the item. If historical interactions for the content item occurs at the third price, a third weighted coefficient may be applied to such historical interactions. The third price may be free or may be a price less than the second price to view the content item. The identification and application of a corresponding weight coefficient may occur for any number of prices at which the content item is available to view, as indicated in step 618 and step 620. As such, the above steps may occur any number of times corresponding to the number of prices for viewing the content item from the network 100. If the content item is viewed for free or for a small fee, the historical viewing and browsing interactions might not be adjusted with a weight coefficient as a view or a browsing activity has a weight of one.

Figure 6A:
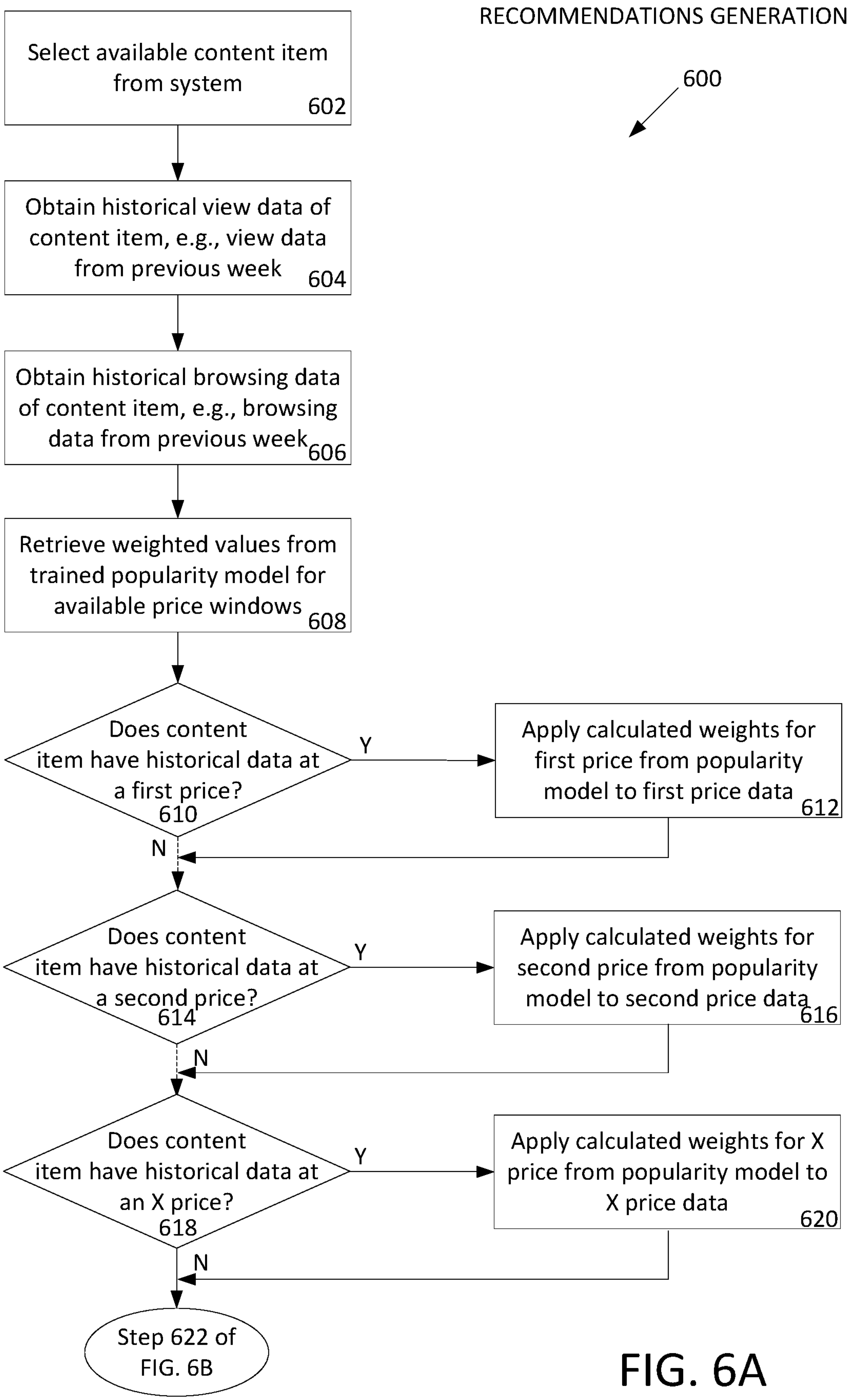
FIGS. 6A-6B is a flow chart showing an example method for obtaining interactions with a content item through multiple pricing and availability windows and generating a ranked list of content recommendations to users of a communication system.
Figure 6B:
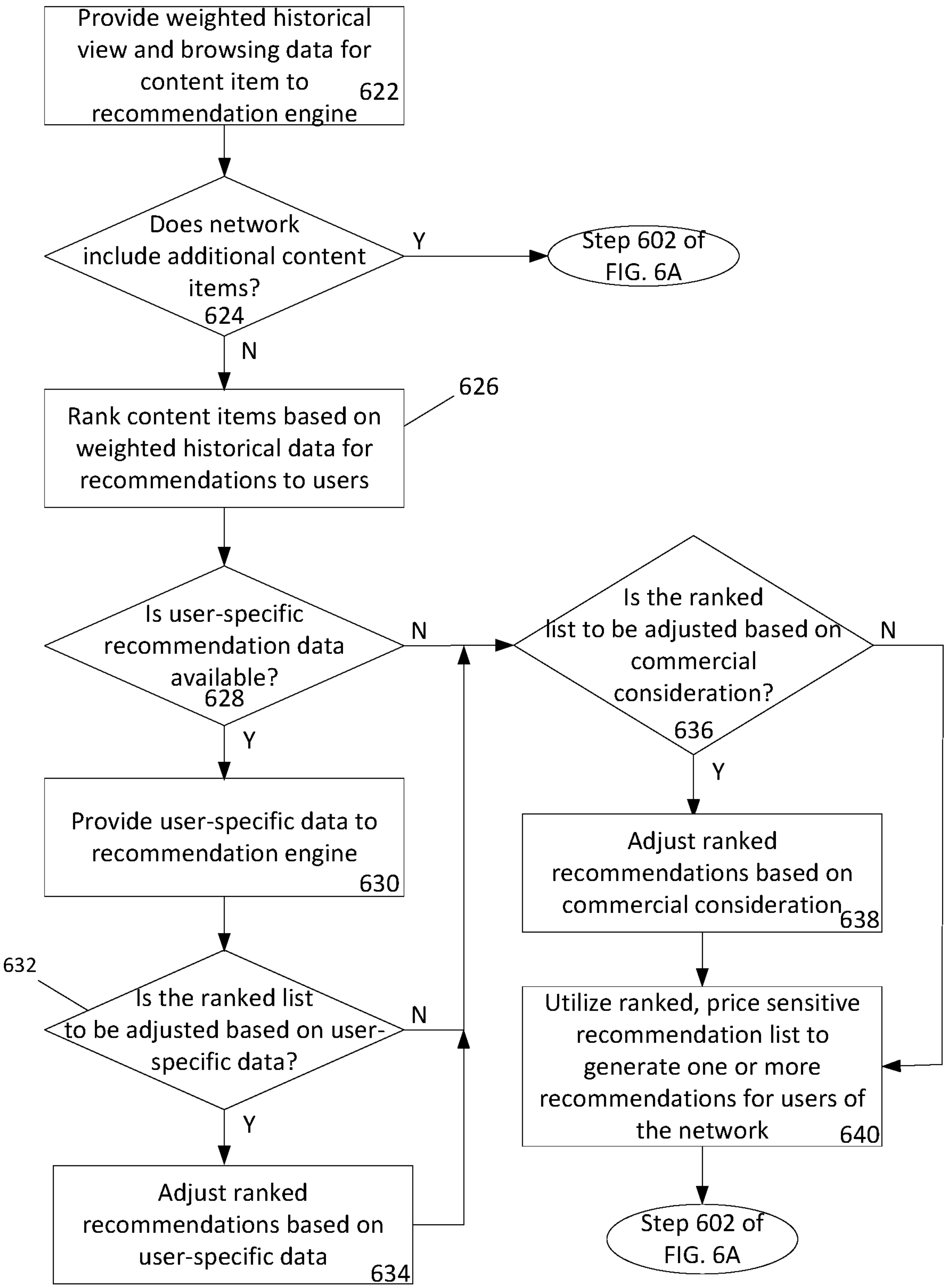

At step 622 of FIG. 6B, the adjusted historical and browsing interactions for the selected content item may be provided to a recommendation engine or server 122. The recommendation server may store the adjusted data for the selected content item for use in generating a ranked list of recommended content items as explained below. In step 624, it may determine if additional content items of the network 100 are available. If other content items are available, the method 600 returns to step 602 where another content item of the network is selected for analysis as steps 604-622 are executed for the newly selected content item. If all (or a predetermined number) of the content items of the network 100 have had the historical viewing and browsing interactions adjusted based on the coefficients of the popularity algorithm, the content items may be ranked based on the popularity index for each content item. Continuing the above example, a particular content item has 10 purchased views, 100 rental views, and 1000 free views. The popularity algorithm may calculate a popularity index of total adjusted views for the content item as (10*100 first price views)+(2.5*300 second price views)+(1000 third price views)=2750 views. Note that without the adjustment or weighted coefficients, the total number of views would be 1400, even though the content item included several views at the higher purchase price. A similar calculation may be performed for measured browsing interactions that applies a determined weighted coefficient for browsing interactions (potentially different than the weighted coefficients for viewing interactions) to determine a weighted number of browsing interactions.

The 2750 adjusted views for the particular content item may be used by a recommendation ranking system as a popularity index input to the recommendation engine. The weighted viewing interactions and browsing interactions may be combined to generate the popularity index for the content item. As one or more of the content items of the network 100 may comprise an adjusted popularity index, the content items may be sorted based on the adjusted popularity index (or unadjusted popularity index for those content items with views that have not been adjusted by a weighted coefficient). The sorted list of content items based on the popularity indexes of the items may be used by a recommendation algorithm or engine to determine which content items are to be presented to users of the network for selection to view. In this manner, the ranked list of recommended content items may be sensitive to the various prices for which the content item is available from the network 100 such that the lower-priced views of the item does not dominate a popularity index for the content item.

Additional adjustments to the sorted list of content items may occur to further tailor the ranked list of recommendations for presentation to users of the network 100. In step 628, it may be determined if user-specific recommendation data is available. User-specific data may comprise any information of a particular user that may affect which content items of the network 100 are recommended to the user. For example, the recommendation algorithm may be executed to determine a list of recommended content items to provide to a particular user or group of users of the network 100. Characteristics of the particular user or group of users may determine which content items are recommended. Such characteristics may comprise the user's preference in types of content items (such as preference for action, science fiction, romance, etc.), the user's past history in purchasing content items, the user's past history in renting content items, obtained advertising information of the user, demographic information of the user (such as age, race, income, location, etc.), the user's past history in browsing content items, and the like. For example, the network 100 may store a list of content items viewed through the network from which a user-specific profile of preferred genres of movies and television may be created, such as horror movies. Further user-specific information may indicate that the user has purchased seven movies over the previous year. The network 100 may label or otherwise indicate a user that purchases over five movies a year as a frequent purchaser of movies from the network 100. The network 100 may then adjust a recommendation to the specific user for any horror movie that becomes available to purchase such that the recommendation is likely to be viewed by the specific user. Any interactions between the user and the network or any other information obtained about the particular user may be included in the user-specific recommendation data. Those users of the network 100 that have similar characteristics may or may not be grouped together by the recommendation engine for determining the content items to recommend to users of the system.

If it is determined that user-specific data is available for the particular user, such data may be provided to the recommendation engine in step 630. In step 632, it is determined if the ranked recommendation list is to be adjusted based on the user-specific data. For example, although user-specific data may be available for some users of the network 100, the recommendation engine may be configured to rely only on the popularity index if determining the content items to recommend to the user. Often, however, the recommendation algorithm or engine may use such user-specific information to adjust the ranked list of recommended content items in step 634.

For example, assume that the user-specific data for a particular user indicates that the user is located in Philadelphia, PA, prefers to view action movies, and has selected to purchase several such action movies in the previous year, such as ten purchases over the last year. With this data, the recommendation engine may alter the ranked content items to move the placement of action movies that are available for purchase in the ranked list to a higher position. Placing such content items higher on the recommendation list may improve the chances that the particular user will see the recommendation and select to view the content item. Content items that are determined to be particularly popular (high number of views by users of the network 100) in Philadelphia, PA may also be adjusted to a higher position within the ranked list of recommendations. The recommendation engine may thus adjust the ranking of recommended content items based on user-specific data provided to or obtained by the recommendation engine to further improve the effectiveness of the content item recommendations.

The user-specific data may indicate that the user has selected to purchase a number of content items that exceeds a threshold value over a period of time, indicating a willingness to pay the purchase fee for content items. Such information may then be used to adjust the rankings of the recommended content items to improve the position of those content items that are only available for purchase. If user-specific browsing data indicates that the particular user is interested in a particular content item, but has not purchased the item during the purchase-only price window, the content item may be placed at or near the top of the ranked recommendations if the item becomes available for rent. Other content items available for rent may also be adjusted based on the particular user's past renting habits. The rankings of the content items for recommendation may thus be adjusted higher or lower in the ranked list based on information obtained from users of the network.

If no user-specific data for the particular user is available, or the ranked recommendation list is not to be adjusted based on such data, it may be determined if the ranked recommendation list is to be adjusted based on commercial considerations in step 636. The network 100 or an administrator of the network may adjust the ranking of the recommended content items based on a commercial consideration in step 638. For example, as purchasing of a content item provides a higher fee to the network 100, the ranking of one or more content items available for purchase may be increased to highlight those options. Similarly, one or more producers of the content items may enter into an agreement with the network 100 to improve the ranked position of those content items. The ranking of one or more content items may then be adjusted based on the agreement with the content producers.

If the ranked recommendation list is not to be adjusted based on commercial considerations or after such adjustment to the ranked recommendations, the ranked recommendations list may be used to generate a recommendation to one or more users of the network 100. For example, the top ten ranked recommendations may be provided to display devices of users of the network to entice the users to select and view the content items. Since some ranked recommendation lists may be particular to some users of the network (based on user-specific data or commercial considerations), different recommendations may be provided to different users of the network 100. The content item recommendations may be displayed in some format on a display device associated with the users of the network. The users, in turn, may select to view or browse the displayed recommendations through an input device, such as a remote control. In general, any number of the ranked recommendations may be displayed in any format as suggestions for viewing by the users.

The method 600 of FIGS. 6A and 6B may be executed any number of times to generate the ranked list of recommended content items. For example, the method 600 may be executed hourly or daily to generate the recommendation list. The method 600 may also be generated if a new content item transitions from one or more of the pricing windows 306-310 to another, such as if a content item becomes available for free to view. The availability of a content item from the network 100 may cause the method 600 to be executed to generate a ranked recommendations list that considers the newly available content item.

A price sensitive ranked list of content item recommendations may be generated that uses viewing and/or browsing data of content items available from a communication system received from users of the system. The viewing and browsing data may be obtained from the users through different availability periods having varying price points for viewing the content items. A recommendation engine may apply weighted values to the viewing and browsing data based on the price point or availability period of the content items associated with the collected data. A popularity index for the content items of the communication system may be determined based on the adjusted viewing and browsing data and a ranking of recommendations for content items may be generated based at least on the popularity index of the content items. Further adjustments to the viewing and browsing data may be applied based on content item and/or user characteristics to generate one or more personal rankings of recommended content items.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

generating, by a computing device, a rank for a content item by weighting different interactions, of a plurality of interactions with the content item, differently and proportional to requirements for receiving the content item during the interactions; and causing output of at least one of:

a ranked list, based on the rank for the content item, of a plurality of content items comprising the content item, or the content item based on recommendation of the content item using the rank.

2. The method of claim 1, wherein the generating the rank for the content item comprises:

determining an initial rank for the content item, wherein determining the initial rank is based on applying a first weight, associated with a first requirement for receiving the content item, to a first quantity of interactions of the plurality of interactions with the content item; and modifying the initial rank for the content item, wherein modifying the initial rank is based on applying a second weight, different from the first weight and associated with a second requirement for receiving the content item, to a second quantity of interactions of the plurality of interactions with the content item.

3. The method of claim 1, wherein the generating the rank for the content item comprises:

multiplying a first quantity of interactions, of the plurality of interactions and associated with a first requirement for receiving the content item, by a first weight; and multiplying a second quantity of interactions, of the plurality of interactions and associated with a second requirement for receiving the content item, by a second weight.

4. The method of claim 1, further comprising:

determining, based on the ranked list, a rank for a second content item.

5. The method of claim 1, further comprising:

receiving interaction data associated with a user;

adjusting, based on the interaction data, the rank for the content item; and sending, to a device associated with the user, the adjusted rank for the content item.

6. The method of claim 1, wherein the weighting the different interactions differently and proportional to requirements for receiving the content during the interactions comprises:

weighting a first interaction proportional to a price of the content item at a time that the first interaction occurred; and weighting a second interaction proportional to a price of the content item at a time that the second interaction occurred.

7. The method of claim 1, wherein the weighting the different interactions differently and proportional to requirements for receiving the content during the interactions comprises:

applying a first weight to a first subset of the plurality of interactions with the content item, wherein the first subset comprises one or more rentals of the content item; and applying a second weight different from the first weight to a second subset of the plurality of interactions with the content item, wherein the second subset comprises one or more purchases of the content item.

8. The method of claim 1, wherein the generating the rank for the content item further comprises:

weighting different interactions, of the plurality of interactions with the content item, differently based on different amounts of time spent interacting with the content item during the interactions.

9. The method of claim 1, wherein the weighting the different interactions, of the plurality of interactions with the content item, proportional to requirements for receiving the content item during the interactions comprises:

weighting a first viewing of a program different from a second view of the program based on requirements for receiving the program during the first viewing and the second viewing.

10. An apparatus comprising:

one or more processors; and memory storing instructions that, when executed by the one or more processors, configure the apparatus to:

generate a rank for a content item by weighting different interactions, of a plurality of interactions with the content item, differently and proportional to requirements for receiving the content item during the interactions; and cause output of at least one of:

a ranked list, based on the rank for the content item, of a plurality of content items comprising the content item, or the content item based on recommendation of the content item using the rank.

11. The apparatus of claim 10, wherein the instructions, when executed by the one or more processors, configure the apparatus to generate the rank for the content item by:

determining an initial rank for the content item, wherein determining the initial rank is based on applying a first weight, associated with a first requirement for receiving the content item, to a first quantity of interactions of the plurality of interactions with the content item; and modifying the initial rank for the content item, wherein modifying the initial rank is based on applying a second weight, different from the first weight and associated with a second requirement for receiving the content item, to a second quantity of interactions of the plurality of interactions with the content item.

12. The apparatus of claim 10, wherein the instructions, when executed by the one or more processors, configure the apparatus to generate the rank for the content item by:

multiplying a first quantity of interactions, of the plurality of interactions and associated with a first requirement for receiving the content item, by a first weight; and multiplying a second quantity of interactions, of the plurality of interactions and associated with a second requirement for receiving the content item, by a second weight.

13. The apparatus of claim 10, wherein the instructions, when executed by the one or more processors, further configure the apparatus to:

determine, based on the ranked list, a rank for a second content item.

14. The apparatus of claim 10, wherein the instructions, when executed by the one or more processors, further configure the apparatus to:

receive interaction data associated with a user;

adjust, based on the interaction data, the rank for the content item; and send, to a device associated with the user, the adjusted rank for the content item.

15. The apparatus of claim 10, wherein the instructions, when executed by the one or more processors, configure the apparatus to weight the different interactions differently and proportional to requirements for receiving the content during the interactions by:

weighting a first interaction proportional to a price of the content item at a time that the first interaction occurred; and weighting a second interaction proportional to a price of the content item at a time that the second interaction occurred.

16. The apparatus of claim 10, wherein the instructions, when executed by the one or more processors, configure the apparatus to weight the different interactions differently and proportional to requirements for receiving the content during the interactions by:

applying a first weight to a first subset of the plurality of interactions with the content item, wherein the first subset comprises one or more rentals of the content item; and applying a second weight different from the first weight to a second subset of the plurality of interactions with the content item, wherein the second subset comprises one or more purchases of the content item.

17. The apparatus of claim 10, wherein the instructions, when executed by the one or more processors, configure the apparatus to generate the rank for the content item further by:

weighting different interactions, of the plurality of interactions with the content item, differently based on different amounts of time spent interacting with the content item during the interactions.

18. A system comprising:

a first computing device; and a second computing device, wherein the first computing device is configured to:

generate a rank for a content item by weighting different interactions, of a plurality of interactions with the content item, differently and proportional to requirements for receiving the content item during the interactions; and cause output of at least one of:

a ranked list, based on the rank for the content item, of a plurality of content items comprising the content item, or the content item based on recommendation of the content item using the rank, and wherein the second computing device is configured to:

output the at least one of:

the ranked list, based on the rank for the content item, of a plurality of content items comprising the content item, or the content item based on recommendation of the content item using the rank.

19. The system of claim 18, wherein the first computing device is configured to generate the rank for the content item by:

determining an initial rank for the content item, wherein determining the initial rank is based on applying a first weight, associated with a first requirement for receiving the content item, to a first quantity of interactions of the plurality of interactions with the content item; and modifying the initial rank for the content item, wherein modifying the initial rank is based on applying a second weight, different from the first weight and associated with a second requirement for receiving the content item, to a second quantity of interactions of the plurality of interactions with the content item.

20. The system of claim 18, wherein the first computing device is configured to generate the rank for the content item by:

multiplying a first quantity of interactions, of the plurality of interactions and associated with a first requirement to receive the content item, by a first weight; and multiplying a second quantity of interactions, of the plurality of interactions and associated with a second requirement to receive the content item, by a second weight.

21. The system of claim 18, wherein the first computing device is further configured to:

determine, based on the ranked list, a rank for a second content item.

22. The system of claim 18, wherein:

the first computing device is further configured to:

receive interaction data associated with a user;

adjust, based on the interaction data, the rank for the content item; and send, to the second computing device, wherein the second computing device is a device associated with the user, the adjusted rank for the content item, and the second computing device is further configured to:

output the adjusted rank for the content item.

23. The system of claim 18, wherein the first computing device is configured to weight the different interactions differently and proportional to requirements for receiving the content during the interactions by:

weighting a first interaction proportional to a price of the content item at a time that the first interaction occurred; and weighting a second interaction proportional to a price of the content item at a time that the second interaction occurred.

24. The system of claim 18, wherein the first computing device is configured to weight the different interactions differently and proportional to requirements for receiving the content during the interactions by:

applying a first weight to a first subset of the plurality of interactions with the content item, wherein the first subset comprises one or more rentals of the content item; and applying a second weight different from the first weight to a second subset of the plurality of interactions with the content item, wherein the second subset comprises one or more purchases of the content item.

25. The system of claim 18, wherein the first computing device is configured to generate the rank for the content item further by:

weighting different interactions, of the plurality of interactions with the content item, differently based on different amounts of time spent interacting with the content item during the interactions.

26. One or more non-transitory computer readable medium storing instructions that, when executed, cause:

generating, by a computing device, a rank for a content item by weighting different interactions, of a plurality of interactions with the content item, differently and proportional to requirements for receiving the content item during the interactions; and causing output of at least one of:

a ranked list, based on the rank for the content item, of a plurality of content items comprising the content item, or the content item based on recommendation of the content item using the rank.

27. The one or more non-transitory computer readable medium of claim 26, wherein the instructions, when executed, cause generating the rank for the content item by causing:

determining an initial rank for the content item, wherein determining the initial rank is based on applying a first weight, associated with a first requirement for receiving the content item, to a first quantity of interactions of the plurality of interactions with the content item; and modifying the initial rank for the content item, wherein modifying the initial rank is based on applying a second weight, different from the first weight and associated with a second requirement for receiving the content item, to a second quantity of interactions of the plurality of interactions with the content item.

28. The one or more non-transitory computer readable medium of claim 26, wherein the instructions, when executed, cause generating the rank for the content item by causing:

multiplying a first quantity of interactions, of the plurality of interactions and associated with a first requirement for receiving the content item, by a first weight; and multiplying a second quantity of interactions, of the plurality of interactions and associated with a second requirement for receiving the content item, by a second weight.

29. The one or more non-transitory computer readable medium of claim 26, wherein the instructions, when executed, further cause:

determining, based on the ranked list, a rank for a second content item.

30. The one or more non-transitory computer readable medium of claim 26, wherein the instructions, when executed, further cause:

receiving interaction data associated with a user;

adjusting, based on the interaction data, the rank for the content item; and sending, to a device associated with the user, the adjusted rank for the content item.

31. The one or more non-transitory computer readable medium of claim 26, wherein the instructions, when executed, cause weighting the different interactions differently and proportional to requirements for receiving the content during the interactions by causing:

weighting a first interaction proportional to a price of the content item at a time that the first interaction occurred; and weighting a second interaction proportional to a price of the content item at a time that the second interaction occurred.

32. The one or more non-transitory computer readable medium of claim 26, wherein the instructions, when executed, cause the weighting the different interactions differently and proportional to requirements for receiving the content during the interactions by causing:

applying a first weight to a first subset of the plurality of interactions with the content item, wherein the first subset comprises one or more rentals of the content item; and applying a second weight different from the first weight to a second subset of the plurality of interactions with the content item, wherein the second subset comprises one or more purchases of the content item.

33. The one or more non-transitory computer readable medium of claim 26, wherein the instructions, when executed, cause the generating the rank for the content item by causing:

weighting different interactions, of the plurality of interactions with the content item, differently based on different amounts of time spent interacting with the content item during the interactions.

* * * * *